UNITED STATES PATENT OFFICE.

ROBERT V. BROWN, OF PULLMAN, ILLINOIS, ASSIGNOR TO THE SHERWIN-WILLIAMS COMPANY, OF CLEVELAND, OHIO, A CORPORATION OF OHIO.

METHOD OF MAKING PAINTS.

1,192,163.   Specification of Letters Patent.   Patented July 25, 1916.

No Drawing.   Application filed October 3, 1913. Serial No. 793,127.

*To all whom it may concern:*

Be it known that I, ROBERT V. BROWN, a citizen of the United States, and a resident of Pullman, county of Cook, and State of Illinois, have invented a new and useful Improvement in Methods of Making Paints, of which the following is a specification, the principle of the invention being herein explained and the best mode in which I have contemplated applying that principle, so as to distinguish it from other inventions.

The present invention relates to the manufacture of paints, enamels and similar compositions.

The objects of the invention are to separate pigments from the liquors in which they have been manufactured and incorporate them in a suitable vehicle without the necessity of intermediately drying and grinding the pigments; and to effect this separation and incorporation by the agency of substances which not only will not be harmful in the product but will increase the drying quality of the finished composition.

Any desired pigment or color may be manufactured in the usual manner, and at the end of the manufacturing process the pigment is suspended in a watery liquor. In the manufacture of certain pigments, such for instance as chrome yellows and chrome greens, lead acetate or other lead salt is used, and in the practice of the process of the present invention the ingredients are so proportioned that there is present in the watery liquor at the end of the pigment manufacturing process from 4% to 6% of lead acetate. In the manufacture of pigments in which the lead salt is not used, from 4% to 6% lead acetate is directly added to the liquor in which the pigment is suspended at the end of the process of its manufacture. In the process of this invention there is then added to the liquor containing the pigment a lead salt and water soluble soap formed from a drying vegetable oil, and one which will react with the lead salt to precipitate an insoluble soap possessing drying qualities. Sodium linoleate is preferably used as a soluble soap, and it will react with lead acetate in the liquor of the pigment to form lead linoleate which is in itself an efficacious and well known drier.

The amount of sodium linoleate which may be advantageously used in the process varies with the pigments being treated. I have found it desirable, in the manufacture of yellow and red colors, to form the sodium linoleate by heating into solution linseed oil equal to from 3% to 5% of the dry color being treated, and caustic soda equal to approximately 15% of the weight of the oil; I have obtained satisfactory results with greens by using linseed oil equal to 7% by weight of the dry color, and caustic soda equal to 15% by weight of the oil. After the linseed oil and caustic soda have been cooked into complete solution the product is sodium linoleate which is a soap soluble in the watery liquor in which the pigments have been manufactured. The sodium linoleate is added to the liquor which holds the pigment and the lead acetate and is thoroughly stirred therein. The lead acetate reacts with the sodium linoleate and precipitates with the pigment lead linoleate. The pigment and lead linoleate settle quickly, and after the excess liquor has been run off the mass of pigment and linoleate is filter-pressed and transferred to steam jacketed paint mixers. In these mixers the mass is incorporated into a suitable vehicle to form the finished product, the vehicle usually being linseed oil. It is highly desirable in the practice of the present process to use linseed oil which has been specially refined with sulfuric acid or other suitable acid until the oil has a relatively high acid content, for example, from 4% to 6%. The linseed oil, preferably refined as described, is added to the mass in the mixer in amount varying with the pigment being treated and with the consistency desired in the finished product. Upon agitation the oil drives out the water from the mass of pigment and linoleate and incorporates them into itself to form the finished oil paint paste. The separation of the water and the incorporation of the pigment and linoleate into the oil vehicle is materially aided by the maintenance of increased temperature during the agitation in the mixer. I have found that highly satisfactory results are obtained by maintaining a temperature of from 80° C. to 100° C. until a partial separation of the water takes place, and then maintaining a temperature of 100° C. for a comparatively short time to finally eliminate the water.

In the practice of the process described the pigment is separated from the water necessarily present as a result of the manufacture of the pigment and incorporated into the desired vehicle by the conjoint action of the vehicle itself and a drier which is highly desirable in the finished product, so that there is nothing added to the pigment during the process except substances which are desirable and efficacious in the finished paint.

The process of the present invention may be practised by omitting to provide for an excess of lead salt solution or by omitting to add to lead salt solution, as the case may be, and by forming the lead linoleate separately, dissolving it in linseed oil, preferably of high acid content, and then adding this solution to the pigment after the latter has been filter-pressed. This method is essentially the same as that described above, for the replacement of the water and the incorporation of the pigment into its vehicle is accomplished by the action of the vehicle and a drier. This method has an added advantage, however, over effecting the precipitation of the insoluble soap *in situ*, in that both the refined linseed oil and the lead linoleate are in themselves ordinary and largely used articles of commerce.

It is to be understood that the present invention comprehends the use of other and equivalent substances in substitution for the specific substances mentioned in the foregoing description. One skilled in the art of paint manufacture will readily understand that the process described may be effectively employed by utilizing vehicles other than linseed oil and by using, instead of lead linoleate, other driers precipitated, in the presence of the pigment in water or separately, by a reaction between a suitable salt and a metallic compound of a drying oil. It is furthermore to be understood that the process provided by the present invention may be practised by utilizing variable quantities of the several substances, and any skilled paint manufacturer will be able to determine the amounts required to obtain, by means of the present process, the result which he desires.

Other modes of applying the principles of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of making paints and the like, which consists of mixing together a pigment in water, lead linoleate, and linseed oil having a relatively high acid content, whereby the oil replaces the water and incorporates the pigment and linoleate.

2. The method of making paints and the like, which consists of mixing together a pigment in water, lead linoleate, and linseed oil having a relatively high acid content, and heating the mixture, whereby the oil replaces the water and incorporates the pigment and linoleate.

3. The method of making paints and the like, which consists of mixing together a water-insoluble soap of a drying vegetable oil and a drying vegetable oil, and adding the mixture to a pigment in water, whereby the oil replaces the water and incorporates the pigment and soap.

4. The method of making paints and the like, which consists of mixing together lead linoleate and linseed oil, and adding the mixture to a pigment in water, whereby the oil replaces the water and incorporates the pigment and linoleate.

5. The method of making paints and the like, which consists of mixing together lead linoleate and linseed oil having a relatively high acid content, adding the mixture to a pigment in water, and heating the resulting mass, whereby the oil replaces the water and incorporates the pigment and linoleate.

Signed by me, this 29th day of September, 1913.

ROBERT V. BROWN.

Attested by—
M. J. SCHENEKER,
R. H. WASSON.